(12) United States Patent
Amir et al.

(10) Patent No.: US 11,140,221 B2
(45) Date of Patent: Oct. 5, 2021

(54) NETWORK-ATTACK-RESILIENT INTRUSION-TOLERANT SCADA ARCHITECTURE

(71) Applicant: THE JOHNS HOPKINS UNIVERSITY, Baltimore, MD (US)

(72) Inventors: Yair Amir, Baltimore, MD (US); Amy Babay, Baltimore, MD (US); Thomas Tantillo, Baltimore, MD (US)

(73) Assignee: THE JOHNS HOPKINS UNIVERSITY, Baltimore, MD (US)

( * ) Notice: Subject to any disclaimer, the term of this patent is extended or adjusted under 35 U.S.C. 154(b) by 186 days.

(21) Appl. No.: 16/313,459

(22) PCT Filed: Jun. 21, 2017

(86) PCT No.: PCT/US2017/038565
§ 371 (c)(1),
(2) Date: Dec. 26, 2018

(87) PCT Pub. No.: WO2018/071067
PCT Pub. Date: Apr. 19, 2018

(65) Prior Publication Data
US 2019/0320015 A1    Oct. 17, 2019

Related U.S. Application Data

(60) Provisional application No. 62/353,256, filed on Jun. 22, 2016.

(51) Int. Cl.
*H04L 29/08*    (2006.01)
*H04L 29/06*    (2006.01)

(52) U.S. Cl.
CPC ...... *H04L 67/1051* (2013.01); *H04L 63/1425* (2013.01); *H04L 63/164* (2013.01); *H04L 67/1095* (2013.01); *H04L 67/2814* (2013.01)

(58) Field of Classification Search
CPC ... H04L 67/1051; H04L 9/004; G06F 11/0709
See application file for complete search history.

(56) References Cited

U.S. PATENT DOCUMENTS 7,631,016 B2 *   12/2009   Lee ................... G06F 16/273
                                                   707/610
8,732,282 B1 *   5/2014    Waas .................. G06F 11/0709
                                                   709/221

(Continued)

OTHER PUBLICATIONS

Herlihy, "A Quorum-Consensus Replication Method for Abstract Data Types", 1986 (Year: 1986).*

(Continued)

*Primary Examiner* — Ondrej C Vostal
(74) *Attorney, Agent, or Firm* — MH2 Technology Law Group, LLP (57) ABSTRACT

The present invention generally relates to network-attack-resilient intrusion-tolerant Supervisory Control and Data Acquisition (SCADA) systems. Some implementations utilize redundant, proactively-recovery-configured servers at multiple centers communally executing a replication protocol. Some implementations, in addition to control centers, include data centers, which participate in the replication protocol, except that they may not be capable of controlling remote units such as Remote Terminal Units (RTUs).

22 Claims, 4 Drawing Sheets

(56) References Cited

U.S. PATENT DOCUMENTS

| | | | | |
|---|---|---|---|---|
| 10,530,808 B2* | 1/2020 | Giura | ............ | H04L 51/12 |
| 2002/0116611 A1* | 8/2002 | Zhou | ............ | H04L 9/004 |
| | | | | 713/156 |
| 2002/0129087 A1* | 9/2002 | Cachin | ............ | H04L 9/3255 |
| | | | | 709/200 |
| 2003/0158908 A1* | 8/2003 | Jacobs | ............ | H04L 69/40 |
| | | | | 709/214 |
| 2006/0155781 A1* | 7/2006 | MacCormick | ............ | G06F 16/27 |
| 2006/0253856 A1* | 11/2006 | Hu | ............ | G06F 9/526 |
| | | | | 718/104 |
| 2008/0301199 A1* | 12/2008 | Bockhold | ............ | G06F 11/2023 |
| 2010/0017644 A1* | 1/2010 | Butterworth | ............ | G06F 11/1658 |
| | | | | 714/4.1 |
| 2010/0094981 A1* | 4/2010 | Cordray | ............ | H04L 41/082 |
| | | | | 709/222 |
| 2010/0180116 A1* | 7/2010 | Coan | ............ | H04L 9/0891 |
| | | | | 713/168 |
| 2011/0039237 A1* | 2/2011 | Skare | ............ | G06F 21/577 |
| | | | | 434/118 |
| 2013/0053986 A1* | 2/2013 | Goose | ............ | G05B 19/4183 |
| | | | | 700/9 |
| 2015/0150129 A1* | 5/2015 | Giura | ............ | H04L 63/1483 |
| | | | | 726/23 |
| 2015/0186229 A1* | 7/2015 | Bortnikov | ............ | G06F 11/2041 |
| | | | | 714/4.11 |
| 2016/0057226 A1* | 2/2016 | Bestler | ............ | H04L 67/1095 |
| | | | | 709/217 |
| 2016/0134643 A1* | 5/2016 | Giura | ............ | H04L 63/1441 |
| | | | | 726/23 |
| 2017/0264559 A1* | 9/2017 | Lu | ............ | H04L 67/26 |
| 2019/0386829 A1* | 12/2019 | Karame | ............ | G06F 11/1451 |

OTHER PUBLICATIONS

Herlihyetal., "Howto Make Replicated Data Secure", 1997 (Year: 1997).*
Malkhi et al., "Byzantine Quorum Systems", 1997 (Year: 1997).*
Malkhi, "Secure and Scalable Replication in Phalanx", 1998 (Year: 1998).*
Malkhi et al., "Survivable Consensus Objects", 1998 (Year: 1998).*
Reiter et al., "The Omega key management service", 1996 (Year: 1996).*
Almeida et al., "ChainReaction: a Causal+ Consistent Datastore based on Chain Replication", 2013 (Year: 2013).*
Amir et al., "From Total Order to Database Replication", 2002 (Year: 2002).*
Bessani et al., "A Guided Tour on the Theory and Practice of State Machine Replication", 2014 (Year: 2014).*
Defago et al., "Specification of Replication Techniques, Semi-Passive Replication, and Lazy Consensus*", 2001 (Year: 2001).*
Fritzke et al., "Adaptive Replication Control based on Consensus*", 2008 (Year: 2008).*
Garcia et al., "SieveQ: A Layered BFT Protection System for Critical Services", 2016 (Year: 2016).*
Jimenez-Peris et al., "How to Select a Replication Protocol According to Scalability, Availability and Communication Overhead", 2001 (Year: 2001).*
Kirsch et al., "Survivable SCADA Via Intrusion-Tolerant Replication", 2014 (Year: 2014).*
Medeiros, "A Fault- and Intrusion-Tolerant Architecture for EDP Distribuicao SCADA System", 2011 (Year: 2011).*
Medeiros, "A Fault- and Intrusion-Tolerant Architecture for EDP Distribuicao SCADA System", Abstract in English, 2011 (Year: 2011 ).*

* cited by examiner

PRIOR ART

NETWORK-ATTACK-RESILIENT INTRUSION-TOLERANT SCADA ARCHITECTURE

CROSS-REFERENCE TO RELATED APPLICATIONS

This application is a national stage conversion under 35 U.S.C. § 371 of PCT Application No. PCT/US2017/038565 entitled "NETWORK-ATTACK-RESILIENT INTRUSION-TOLERANT SCADA ARCHITECTURE" filed Jun. 21, 2017, which claims priority to, and the benefit of, U.S. Provisional Patent Application No. 62/353,256 entitled, "NETWORK-ATTACK-RESILIENT INTRUSION-TOLERANT SCADA ARCHITECTURE" filed on Jun. 22, 2016, the entirety of which is hereby incorporated by reference.

GOVERNMENT LICENSE RIGHTS

This invention was made with government support under contract number N660001-1-2-4014 awarded by DARPA. The government has certain rights in the invention.

FIELD OF THE INVENTION

This invention relates generally to industrial control systems, such as Supervisory Control and Data Acquisition (SCADA) systems.

BACKGROUND OF THE INVENTION

Today's SCADA systems use fault-tolerance techniques in an attempt to remain available even when parts of the system fail. In particular, state-of-the-art SCADA systems use a hot backup of the SCADA master within a single control center to take over if the primary SCADA master fails. In addition, many SCADA systems use a cold-backup approach of maintaining a backup control center in a different geographic location that can be activated within a few minutes to a few hours by the SCADA system operators if the primary control center fails.

Using this approach, a SCADA system can successfully withstand a single benign failure of a single server within a control center and can restore operation after a complete control center failure with a few minutes or hours of downtime. When a control center fails as the result of a single benign problem, the few minutes or hours of downtime are likely to occur at a normal, non-critical time, and therefore are considered acceptable today.

However, as malicious attacks become more prevalent, the assumptions that failures will generally not occur at critical times and that only benign failures need to be addressed no longer hold. For example, a sophisticated attacker can take down the primary control center at a critical moment, incurring system downtime at the worst possible time (e.g., during a major snowstorm or during a coordinated large-scale attack in multiple domains).

Switching from a cold-backup approach to a hot-backup approach, where the backup control center is always active and ready to take over, does not solve the problem: network partitions (due to either benign failures or malicious attacks) can cause a split-brain problem in which both control centers believe they are the primary and try to issue control commands. Beyond this, a compromised SCADA master (in either a cold-backup or hot-backup approach) can issue incorrect commands, with devastating effects on the SCADA system.

SUMMARY OF THE INVENTION

According to various embodiments, a network-attack-resilient, intrusion-tolerant electronic supervisory control and data acquisition (SCADA) system is disclosed. The system includes at least three centers including at least two control centers, the at least three centers situated at different geographic locations; a plurality of servers situated at the at least three centers, where the at least three centers each include at least two servers of the plurality of servers; where the plurality of servers are communicatively coupled over a computer network to each-other and to at least one remote unit; where the plurality of servers are configured to participate in a replication protocol; where, when servers at one center of the plurality of centers are disconnected from the computer network, and when one server of the plurality of servers at another center of the plurality of centers is compromised, the system uses the replication protocol to reach consensus among connected operational servers of the plurality of servers for system updates and to issue instructions to the remote unit.

Various optional features of the above embodiments include the following. The replication protocol may include a Byzantine replication protocol. One of the centers of the plurality of centers may be disconnected from the computer network and one server of the plurality of servers at another center of the plurality of centers may be compromised; where the system uses the replication protocol to reach consensus among operational servers of the plurality of servers to issue a command to the remote unit; and where the remote unit executes the command within one second of a time of issuance of the command. The at least two control centers may include servers of the plurality of servers configured to issue instructions to the at least one remote unit, and where the plurality of centers further include at least a first data center including servers of the plurality of servers not configured to issue instructions to the at least one remote unit. The system may include a second data center in a different geographic location than locations of the at least two control centers and the first data center, the second data center including at least two servers of the plurality of servers communicatively coupled to the at least one remote unit and not configured to issue instructions to the at least one remote unit. The system may include a third data center in a different geographic location than locations of the at least two control centers, the first data center, and the second data center; where the third data center includes at least two servers of the plurality of servers communicatively coupled to the at least one remote unit and not configured to issue instructions to the at least one remote unit; where each of the at least two control centers include at least three servers of the plurality of servers. Each of the at least two control centers may include at least four servers of the plurality of servers communicatively coupled to the at least one remote unit and configured to issue instructions to the at least one remote unit; and where the first data center includes at least four servers of the plurality of servers. During a time of a fault of at most one of the plurality of servers and an ongoing proactive recovery of at most one of the plurality of servers, the system may use the replication protocol to reach consensus among connected operational servers of the plurality of servers for system updates and to issue instructions to the at least one remote unit, such that the at least one remote unit executes any instruction sent by a server of the plurality of servers within one second of a time of issuance of the command. The at least one remote unit may include at least one remote unit selected from the group consisting of:

remote terminal unit (RTU) and programmable logic controller (PLC). The plurality of servers may be configured to undergo proactive recovery on a periodic basis.

According to various embodiments, a method of providing a network-attack-resilient, intrusion-tolerant electronic supervisory control and data acquisition (SCADA) system is disclosed. The method includes accessing at least three centers including at least two control centers, the at least three centers situated at different geographic locations; configuring a plurality of servers situated at the at least three centers, where the at least three centers each include at least two servers of the plurality of servers, where the plurality of servers are communicatively coupled over a computer network to each-other and to at least one remote unit, where the configuring includes configuring the plurality of servers to participate in a replication protocol; where, when servers of one center of the plurality of centers are disconnected from the computer network, and when one server of the plurality of servers at another center of the plurality of centers is compromised, the plurality of servers use the replication protocol to reach consensus among connected operational servers of the plurality of servers for system updates and to issue instructions to the remote unit.

Various optional features of the above embodiments include the following. The replication protocol may include a Byzantine replication protocol. One center of the plurality of centers may be disconnected from the computer network and one server of the plurality of servers at another center of the plurality of centers may be compromised, the method further including: using the replication protocol to reach consensus among operational servers of the plurality of servers to issue a command to the remote unit, such that the remote unit executes the command within one second of a time of issuance of the command. The at least two control centers may include servers of the plurality of servers configured to issue instructions to the at least one remote unit, and where the plurality of centers further include at least a first data center including at least two servers of the plurality of servers not configured to issue instructions to the at least one remote unit. The method may include: accessing a second data center in a different geographic location than locations of the at least two control centers and the first data center; and configuring at least two servers of the plurality of servers at the second data center and communicatively coupled to the at least one remote unit to not issue instructions to the at least one remote unit. The method may include accessing a third data center in a different geographic location than locations of the at least two control centers, the first data center, and the second data center; and configuring at least two servers of the plurality of servers at the third data center communicatively coupled to the at least one remote unit to not issue instructions to the at least one remote unit; where the first control center includes at least three servers of the plurality of servers; and where the second control center includes at least three servers of the plurality of servers. Each of the at least two control centers may include at least four servers of the plurality of servers communicatively coupled to the at least one remote unit, and the first data center may include at least four servers of the plurality of servers; the method may further include: configuring the at least four servers of the plurality of servers at each of the at least two control centers to issue instructions to the at least one remote unit; and configuring the at least four servers of the plurality of servers at the first data center to not issue instructions to the at least one remote unit. The method may further include, during a time of a fault of at most one of the plurality of servers and an ongoing proactive recovery of at most one of the plurality of servers, using the replication protocol to reach consensus among connected operational servers of the plurality of servers for system updates and to issue instructions to the remote unit, such that the remote unit executes any instruction sent by a server of the plurality of servers within one second of a time of issuance of the command. The at least one remote unit may include at least one remote unit selected from the group consisting of: remote terminal unit (RTU) and programmable logic controller (PLC). The plurality of servers may be further configured to undergo proactive recovery on a periodic basis.

BRIEF DESCRIPTION OF THE DRAWINGS

Various features of the embodiments can be more fully appreciated, as the same become better understood with reference to the following detailed description of the embodiments when considered in connection with the accompanying figures, in which.

DESCRIPTION OF THE EMBODIMENTS

Reference will now be made in detail to the present embodiments (exemplary embodiments) of the invention, examples of which are illustrated in the accompanying drawings. Wherever possible, the same reference numbers will be used throughout the drawings to refer to the same or like parts. In the following description, reference is made to the accompanying drawings that form a part thereof, and in which is shown by way of illustration specific exemplary embodiments in which the invention may be practiced. These embodiments are described in sufficient detail to enable those skilled in the art to practice the invention and it is to be understood that other embodiments may be utilized and that changes may be made without departing from the scope of the invention. The following description is, therefore, merely exemplary.

Maintaining continuous availability of SCADA systems in a malicious environment involves making them resilient to a fault model that is much broader than just benign faults. Specifically, such a system should tolerate both compromises of system components, such as the SCADA master, and network attacks that potentially completely isolate and disconnect a targeted site from the network. Such a model, including both intrusions at the application service level and attacks on the network, has not previously been considered. To support this broader fault model, this document discloses a resilient architecture that includes protection at both the network and system levels.

The disclosed architecture can guarantee both safety and performance, even in the presence of failures, attacks, and compromises. "Safety" means that the state of the system and commands issued by the system are guaranteed to be correct (or consistent). "Performance" is relative to a bounded delay and means that any command or update to the system state is guaranteed to be executed within a bounded amount of time after it is introduced. For SCADA systems, this bounded delay may be within 100-200 milliseconds, for example. Note that safety and performance can be guaranteed as long as a sufficient fraction of the system is operating correctly: an attacker that can compromise every component of the system can force the system to take incorrect actions. Embodiments can thwart such a takeover. For example, in order to prevent an attacker from gaining control over a large fraction of the system over a long period of time, some embodiments use proactive recovery. Thus, periodically, each component of the system is taken down and recovered from a known clean state, cleaning any potential intrusion (even if no intrusion was detected). Some embodiments also ensure that the recovered component presents a different attack surface compared with any previous instantiation of this component through the use of diversity. As another example, some embodiments utilize three or more centers, with two control centers and one or more data centers, which may be economically implemented using existing cloud providers. These and other features are described in detail herein.

Figure 1:
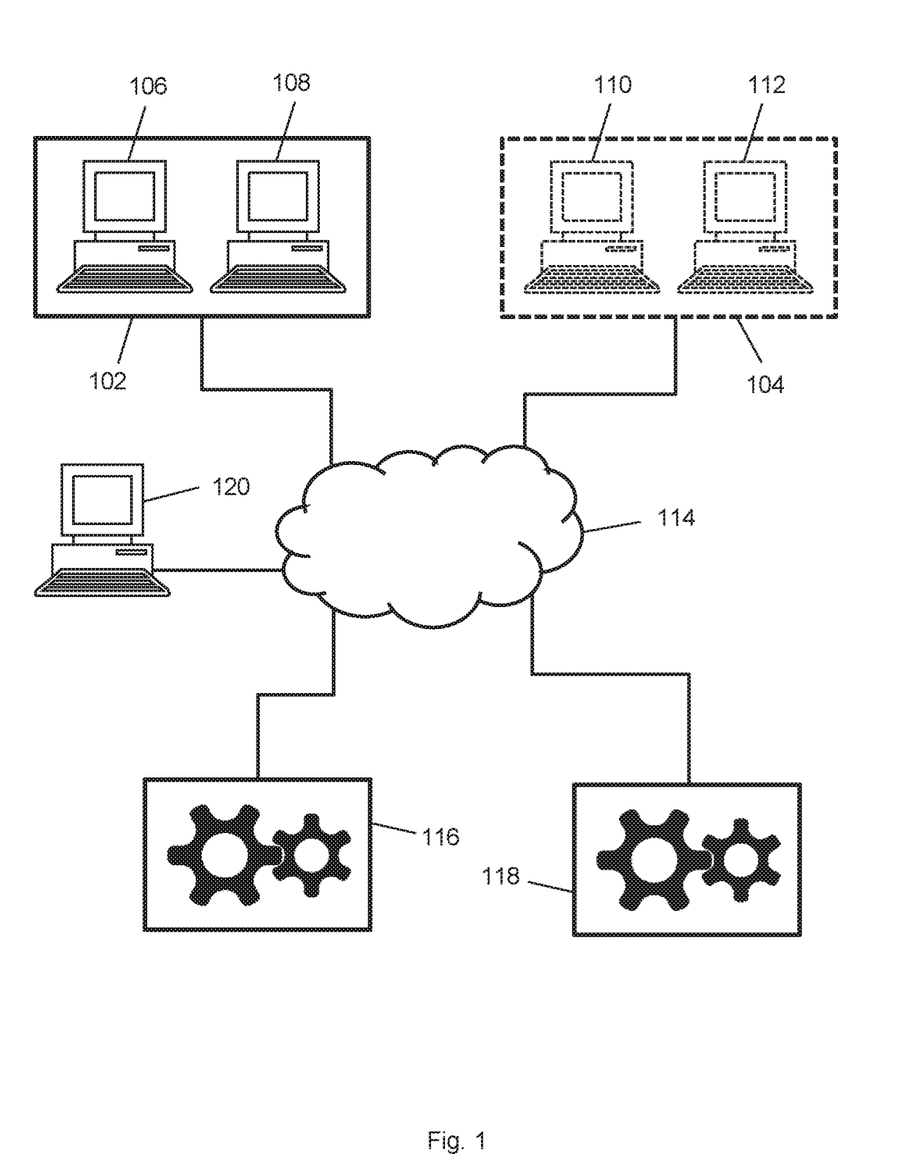
FIG. 1 depicts an example known SCADA system.

FIG. 1 depicts an example known SCADA system. The system includes an active control center 102, which includes active server 106 and hot-swappable backup server 108. (Throughout this disclosure, the terms "site" and "center" are used interchangeably.) The system also includes inactive cold-backup control center 104, which includes servers 110 and 112. When cold-backup control center 104 is activated, server 110 will be active, and server 112 will be a hot-swappable backup to active server 110. These servers, and unless stated otherwise all other servers referred to herein, may be SCADA masters and contain a SCADA real-time database (RTDB), for example; with the exception that data center servers, described herein, are not assumed to be SCADA masters. Servers as disclosed herein may be implemented by hardware server computers or virtual machines executing SCADA server software or modifications thereof.

The system also includes remote units 116, 118. Either or both of remote units 116, 118 may be a remote terminal unit (RTU) or a programmable logic controller (PLC).

The system also includes client 120. Client may be a hardware computer programmed to communicate with SCADA servers. Client 120 may be used to communicate with the other system components (e.g., servers in control centers 102, 104). For example, client 120 may send commands to control center 102, instructing it to control any of remote units 116, 118. Such units may be instructed to take an action or provide data, for example. In some embodiments, client 120 may include a human machine interface (HMI).

Control centers 102, 104, client 120, and remote units 116, 118 are communicatively coupled to each-other through network 114. Network 114 may be or include one or more of: the internet, a local area network (LAN), a wide area network (WAN), an Ethernet network, a specialized network connecting control centers to at least one remote unit, etc.

Notation describing various SCADA server configuration architectures is introduced here and elaborated upon throughout this disclosure. A single numeric digit less than three (i.e., "1" or "2") represents a site with one active server and zero or more co-located hot-swappable backup servers. Thus, "1", without more, represents a control center with a single, not-backed-up server, and "2" represents a control center with a single active server plus a hot-swappable backup server.

A single numeric digit of three or greater, i.e., 3, 4, 5, etc., represents a site with the indicated number of servers. Instead of the servers having active and backup roles, the servers according to this notation all actively participate in a SCADA replication protocol. The replication protocol may be any of a variety of known industrial control system replication protocols, which allow the servers to communicate amongst themselves to ensure that any rogue commands (e.g., issued by a single compromised server, or even by less than a majority of the servers) are not carried out. For example, the servers may communicate amongst themselves to reach consensus regarding any command prior to sending the command to a remote unit for execution. The replication protocol may be any of the known Byzantine replication protocols, for example. Example suitable protocols are disclosed in, for example, Y. Amir, B. Coan, J. Kirsch, and J. Lane, *Prime: Byzantine Replication under Attack*, IEEE TRANSACTIONS ON DEPENDABLE AND SECURE COMPUTING, VOL. 8, NO. 4, July/August 2011, pp. 564-577, and M. Platania, D. Obenshain, T. Tantillo, R. Sharma, Y. Amir, *Towards a Practical Survivable Intrusion Tolerant Replication System,* 2014 IEEE 33rd International Symposium on Reliable Distributed Systems, pp. 242-252.

Continuing the notation description, two numerals separated by a dash "-" represent two control centers with the indicated number of servers in each, with the first numeral representing an active control center, and the second numeral representing a cold-backup control center, which may be brought online in a few minutes to a few hours. Thus, in this notation, the system of FIG. 1 may be described as "2-2".

This notation is further expanded below in reference to FIG. 3 to partially describe novel embodiments according to this disclosure.

Figure 2:
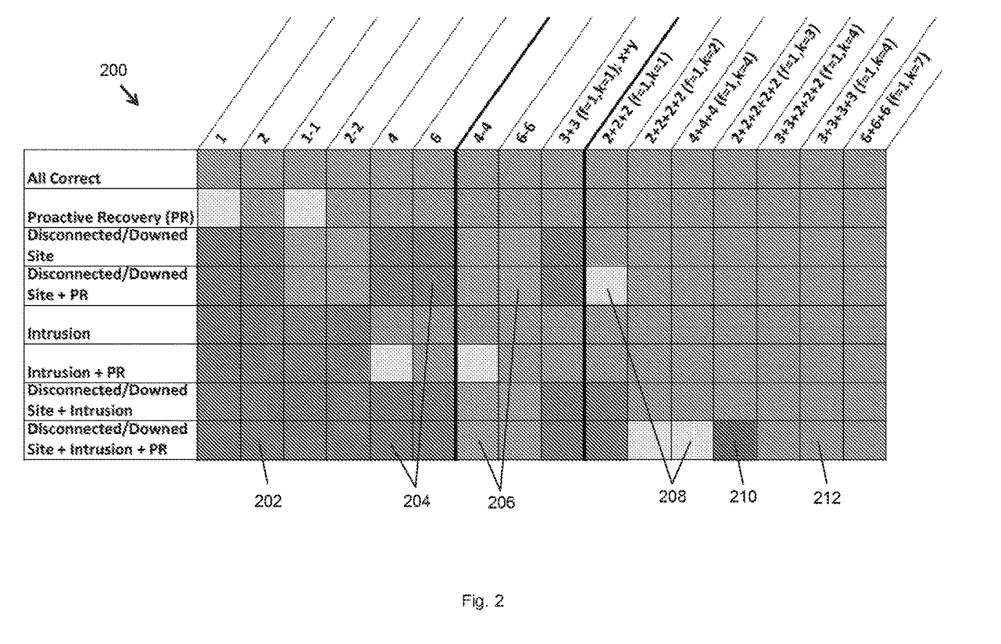
FIG. 2 is a table depicting various known and new SCADA architectures along with their properties.

FIG. 2 depicts a Table 200 depicting various known and new SCADA architectures along with their properties. Each column of Table 200 represents a different SCADA architecture, including both prior art and novel techniques. Each row of Table 200 represents a different possible fault status. Shading in Table 200 represents safety and performance status for the respective architecture configuration and fault. Table 200 thus summarizes several configuration's ability to support proactive recovery, withstand a single disconnected or down site, withstand a single intrusion, and any combination of these three conditions. (Note that a disconnected or down site is assumed to render unavailable all of the servers located at such site.) In particular, Table 200 illustrates the tradeoffs the different configurations make between, on the one hand, the algorithmic sophistication and numbers of servers and sites they require, and, on the other hand, the safety and availability guarantees they provide.

In Table 200, shade 212 represents a fully operational system with performance guarantees when under the respective fault. Specifically, the system is guaranteed to process any update within the bounded amount of time necessary to support SCADA systems for the power grid (e.g., 100-200 milliseconds).

Shade 202 indicates that the system is not guaranteed to remain safe in the presence of the respective fault. As depicted in the first four columns of Table 200, a single intrusion can compromise the state of the respective system.

Shade 204 indicates that the system will remain safe but will not provide any guarantee of progress, in the sense that the network or a site will need to be recovered or repaired before progress can be made. That is, the system will not be able to reflect changes such as updates until the system has recovered.

Shade 206 indicates that the system will remain safe, but will not provide any guarantee of progress until the cold-backup control center is activated. This situation is considered better than that of shade 204, because there is no limit on when the network will be repaired or a down site will be connected in that case, whereas activating a cold-backup site is under the control of the operator.

Shade 208 is similar to shade 212, with the exception that its performance guarantee is not met when a correct replica is undergoing proactive recovery. In this case, progress is guaranteed to resume and performance guarantees will be met once the recovery is finished.

The single cell with shade 210 is similar to shade 212, with the exception that its performance guarantee is not met in a very narrow specific case, where one of the two control centers is down or disconnected, there is an intrusion in the other control center, and the remaining correct server in that control center is currently undergoing proactive recovery. Once the recovery of that specific server is completed, the performance guarantees will be met again, until the next time it is proactively recovered.

Table 200 summarizes the following observations regarding known SCADA system configurations. In general, a SCADA system architecture consisting of a single server (denoted as "1" using notation developed herein) is prone to failures. To overcome a benign failure of the single server, existing SCADA systems may use a hot backup of the SCADA master, as in the configuration denoted "2". Such an architecture allows the backup server to take over when the primary server fails, maintaining system availability. However, both of these configurations are vulnerable to the failure of the entire control center, e.g., a power loss at a control center rendering all servers therein nonfunctional. To recover from the failure of an entire control center, existing SCADA systems use a cold-backup control center, as represented using the present notation using a dash "-". If the primary control center fails, SCADA operators can bring the cold-backup control center online and restore operations within a few minutes to a few hours. The "1-1" configuration represents a basic cold-backup configuration, while the "2-2" configuration represents an architecture in which both the primary and cold-backup control centers include primary and hot-backup servers. Note that in these configurations, only a single control center is operational at any given time; the active control center is determined through out-of-band communication.

As shown in Table 200, none of the architectures represented in the first four columns can maintain safety in the presence of an intrusion. Architectures with only a single control center ("1" and "2") cannot provide progress guarantees when the control center is down, but the cold-backup architectures ("1-1" and "2-2") are able to restore operation once the cold-backup control center is activated. Architectures with a single server in the active control center ("1", "1-1") cannot provide performance guarantees while that server is being proactively recovered to clean a potential intrusion, but architectures that use a hot-backup architecture within the active control center ("2", "2-2") can support proactive recovery without service interruptions (although they may not provide safety in the face of intrusions).

Byzantine fault-tolerant SCADA replication protocols can be used to overcome intrusions by using 3f+1 servers to withstand up to f compromised servers. Thus, to tolerate a single intrusion, a minimum of four servers are used. Adding proactive recovery and diversity can make the system intrusion tolerant over a long system lifetime. Intrusion-tolerant replication with proactive recovery involves 3f+2k+1 servers to tolerate f intrusions and k simultaneous proactive recoveries while providing performance guarantees. With a single intrusion and a single proactive recovery at a time, the minimum number of servers used is six.

Table 200 also depicts an intrusion-tolerant replication solution for SCADA using the "4" configuration. Extending that system to support the "6" configuration can support proactive recovery with performance guarantees for SCADA.

As shown in Table 200, both the "4" and "6" configurations maintain safety in all cases. However, like the other single-control-center architectures ("1", "2"), these configurations cannot provide progress guarantees when the control center is down or disconnected from the rest of the system (e.g. the RTUs). The "6" configuration can support any combination of an intrusion and proactive recovery. The "4" configuration can support an intrusion or proactive recovery, but it cannot provide performance guarantees during the time that a correct server is proactively recovering in the presence of an intrusion.

To maintain safety in the presence of an intrusion (like the "4" and "6" configurations), while also tolerating a down or disconnected control center (like the "1-1" and "2-2" configurations), systems can combine the cold-backup approach with intrusion-tolerant replication. Within a control center, such a system can use four servers to withstand an intrusion ("4-4" configuration), or six servers to withstand an intrusion while supporting proactive recovery with performance guarantees ("6-6" configuration), as described above. If the primary control center fails, the cold-backup control center can be activated. Once activated, the backup control center may similarly use an intrusion-tolerant replication protocol. Thus, two numerals separated by a dash represent two control centers, and each of which may independently execute a replication protocol among servers within the same site.

As shown in Table 200, these combinations improve on the "4" and "6" configurations by allowing them to restore operation after the failure or disconnection of the active control center by activating the cold-backup control center.

Before considering the remainder of Table 200, the notation used herein is expanded to describe additional architectures. According to the notation of this document, two numerals separated by a plus sign "+" represent configurations in which each numeral represents a control center with that number of servers. In contrast to the notation meaning for numerals less than three standing alone or separated by a dash "-", two numerals separated by a plus sign "+", regardless as to their value, represent servers that execute a SCADA replication protocol among all servers in the system, including servers at both sites. Suitable replication protocols are described above in reference to the single-digit-less-than-three notation. The notation that employs the plus sign is used presently in an analysis of architectures having two control centers.

A possible architecture is to use the same six servers as in the "6" configuration split between two control centers, with all servers active at the same time and running the same intrusion-tolerant replication protocol (3f+2k+1). This is depicted by the "3+3" configuration in Table 200. Perhaps surprisingly, splitting the servers across two control centers does not provide any additional resilience over putting all the servers in the same control center in terms of tolerating the failure of one control center. Note that the same behavior occurs regardless of the number of servers in each of the two control centers, i.e. "x+y" configuration for any x and y. This is because one of the centers has at least half of the servers, and the replication protocol cannot make progress when that control center is down because the servers cannot reach a majority consensus.

The above analysis of the "x+y" configuration leads to the conclusion that no "x+y" solution that can overcome a down or disconnected site can exist with only two control centers. ("3+3" and "6+6" are represented in Table 200.) This result means that to overcome a network attack that is able to disconnect a control center, some embodiments include more than two sites. FIG. 3 depicts an example such embodiment.

Figure 3:
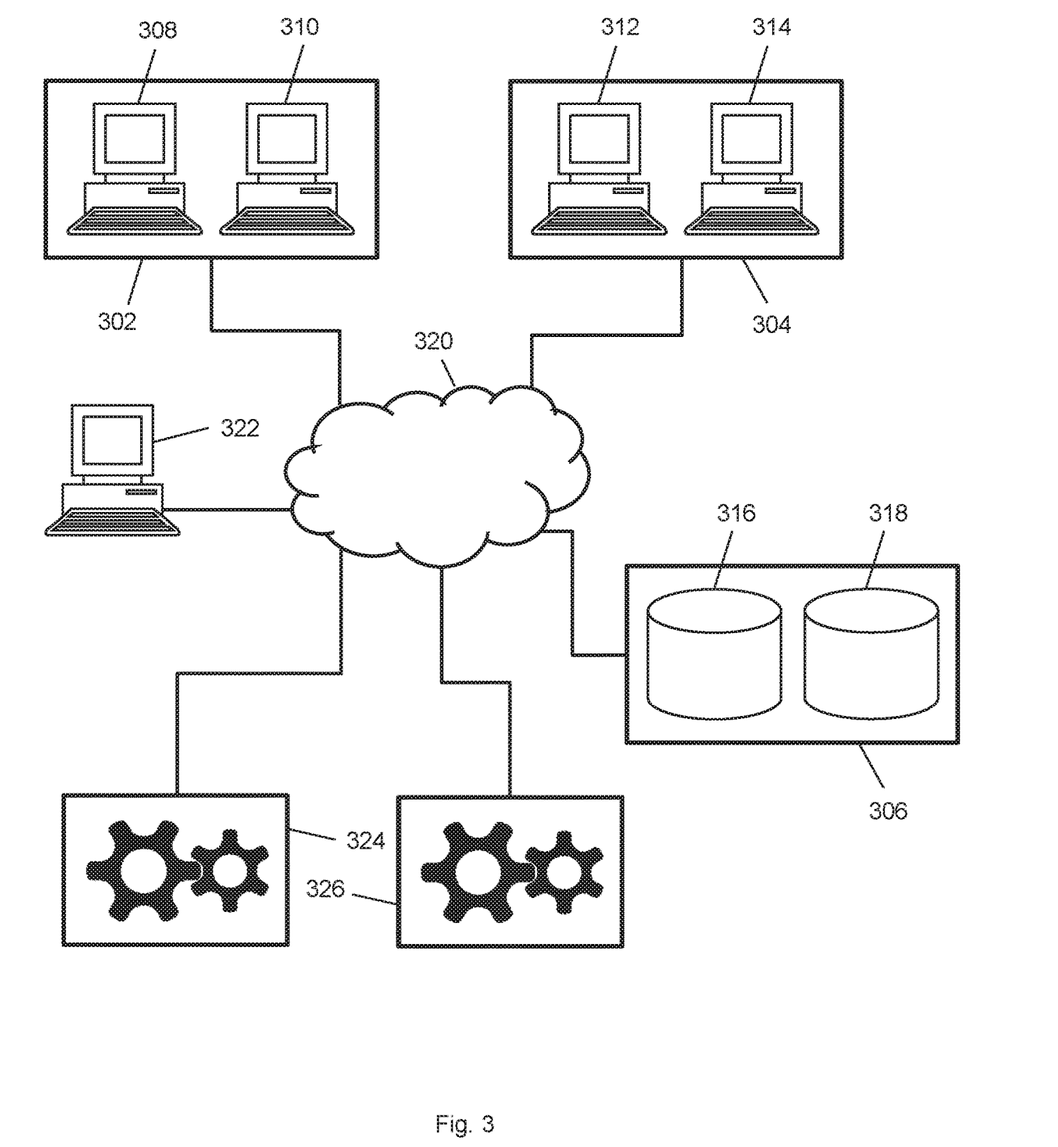
FIG. 3 depicts a network-attack-resilient, fault-tolerant SCADA system having two control centers and one data center according to various embodiments.

Before describing FIG. 3 in detail, however, the description is the notation used herein is concluded. As previously stated, two numerals separated by a plus sign "+" represent configurations in which each numeral represents a control center with that number of servers, all of which executing a SCADA replication protocol. Three of more numerals separated by plus signs are to be interpreted as follows. The first two numerals are interpreted the same as two numerals separated by a plus sign alone: they indicate geographically separate control centers, each having the indicated number of servers, all of which execute a SCADA replication protocol. The third and subsequent numerals denote geographically separate data centers rather than control centers, with each such data center having the noted number of servers.

Data centers according to some embodiments are similar to control centers, with some differences. In particular, the data centers participate in every aspect of the SCADA replication protocol with the other servers in the other centers, except that the data centers may not issue commands to some, or all, remote units, such as RTUs. That is, according to some embodiments, data centers are not configured to issue commands to remote units. Thus, data centers according to some embodiments may be implemented using commercially available commodity data centers, such as cloud services.

Data centers, as disclosed, balance the beneficial fault resistance disclosed herein against the cost of establishing and maintaining additional control centers. Cost realities dictate that entities that utilize SCADA systems, even for important infrastructure services such as power companies, will likely not make available three control centers with complete capabilities for controlling RTUs. However, as disclosed herein, an additional site, or additional sites, do not need to have capabilities to control RTUs. Such sites can be relatively cheaply and practically implemented using commercial commodity data centers such as cloud services.

The data centers may be coupled to the rest of the system using a special network. In order to make it extremely difficult for an attacker to disconnect more than one site from the others, some embodiments connect the data centers using an intrusion-tolerant network, e.g., as disclosed in D. Obenshain, T. Tantillo, A. Babay, J. Schultz, A. Newell, M. Hogue, Y. Amir, and C. Nita-Rotaru., *Practical Intrusion-Tolerant Networks*, Proceedings of the IEEE International Conference on Distributed Computing Systems (ICDCS), June 2016. Such a network may use an overlay approach to connect the sites with redundancy, forcing an attacker to attack many links in the underlying network in order to disrupt communication to a single site. Such an intrusion-tolerant network withstands compromises both in the underlying network and at the overlay level.

FIG. 3 depicts a network-attack-resilient, fault-tolerant SCADA system having two control centers and one data center according to various embodiments. The system includes two control centers 302, 304, each of which includes a pair of servers, 308, 310 and 312, 314, respectively. The system of FIG. 3 also includes data center 306, which includes servers 316, 318. All servers 302, 304, 308, 310, 312, and 314 participate in a SCADA replication protocol, except that servers 316, 318 of data center 306 may participate in the SCADA protocol of the overall system, except that they may not have the ability (or configuration) to send commands to any remote units (e.g., RTUs 324, 326). Servers 308, 310, 312, 314 may be SCADA masters and contain a SCADA RTDB, for example. Such servers may be implemented by hardware server computers executing SCADA server software. Servers 316 and 318 of data center 306 may be similar to SCADA masters, except without the ability (or configuration) to send commands to remote units (e.g., RTUs 324, 326). Such servers may be implemented by hardware server computers or virtual machines executing modified SCADA server software.

The system of FIG. 3 also includes remote units 324, 326. Either or both of remote units 324, 326 may be a remote terminal unit (RTU) or a programmable logic controller (PLC). The remote units may be part of an industrial or infrastructure system, for example. In more detail, remote units 324, 326 may be part of industrial control systems present in any of: electrical power plants (coal, nuclear, etc.), dams, power grids, wastewater treatment, manufacturing plants (e.g., assembly lines), food processing plants, or telecommunications equipment.

The system of FIG. 3 also includes client 322. Client 322 may be a hardware computer programmed to communicate with SCADA servers. Client 322 may be used to communicate with the other system components (e.g., servers in control centers 320, 304 and/or data center 206). For example, client 322 may send commands to control center 302, instructing it to control any of remote units 324, 326. Such units may be instructed to take an action or provide data, for example.

Control centers 302, 304, data center 306, client 322, and remote units 324, 326 are communicatively coupled to each-other through network 320. Network 320 may be or include one or more of: the internet, a local area network (LAN), a wide area network (WAN), an Ethernet network, a specialized network connecting control centers to at least one remote unit, etc. Alternately, or in addition, network 320 may be or include an intrusion-tolerant network such as disclosed herein.

With two control centers and one data center, and with two servers in each site, the architecture depicted in FIG. 3 may be denoted "2+2+2". This architecture uses six servers to overcome both an intrusion and proactive recovery, while providing bounded delay (see Table 200 of FIG. 2, tenth column). As can be further seen in Table 200, this configuration can also support a disconnected site while providing bounded delay. When there is a downed site and an ongoing proactive recovery, the system will wait for the recovery to finish before making progress again. However, the system may not make progress when there is a disconnected site and an intrusion at the same time: performance guarantees may only be met again if the site is reconnected or the intrusion is cleaned. To the best of the inventors' knowledge, this configuration and algorithm is the first architecture that supports (at least to a limited degree) a disconnected site in a malicious environment.

By adding two more servers in another geographically separate data center, (denoted "2+2+2+2") such a system can use a total of eight servers evenly distributed across the two control centers and two data centers to support any combination of a disconnected site, an intrusion, and proactive recovery with bounded delay, with the exception that if all three of these events happen at the same time, the system may not make progress until the ongoing proactive recovery is complete (or until the disconnected site is reconnected, if that occurs before the proactive recovery completes). See Table 200 of FIG. 2, column 11.

By increasing the number of servers from eight to twelve, as in the "4+4+4" configuration, such a system can reduce the number of sites to two control centers and one data center while providing the same guarantees as the "2+2+2+2" configuration. See Table 200 of FIG. 2, column 12.

By adding a fifth site (two control centers and three data centers, "2+2+2+2+2" configuration) such a system can provide an almost complete solution. This solution provides bounded delay except in the narrow case where one control center is down, there is an intrusion in the other control center, and the correct replica in that control center is currently undergoing proactive recovery. In that case, progress stops until that particular replica finishes its recovery, because only control center servers may be able to talk to remote units. See Table 200 of FIG. 2, column 13.

Note that in the "2+2+2+2+2" configuration, if three of the sites are control centers and two of the sites are data centers, the system will be available under all the failure scenarios considered, since there will always be a correct replica available in one of the control centers. Because this may not be practical to require for SCADA environments in the foreseeable future the problem can be alleviated by adding a replica to each of the two control centers, for the "3+3+2+2+2" configuration, for a total of twelve servers. This may be the minimum number of servers to fully support bounded delay in the simultaneous presence of an intrusion, proactive recovery, and a downed control center. See Table 200 of FIG. 2, column 14.

With twelve servers, the system uses only two control centers and two data centers for the "3+3+3+3" configuration, while providing bounded delay in all scenarios. See Table 200 of FIG. 2, column 15. This can even support having only three sites (two control centers and a single data center) if the number of servers is increased to 18, with the "6+6+6" configuration. See Table 200 of FIG. 2, column 16.

The last three configurations of Table 200 of FIG. 2 ("3+3+2+2+2", "3+3+3+3", "6+6+6") are the first to demonstrate a complete solution for a SCADA system with only two control centers that can control remote units under the desired fault model, which includes a single intrusion and a simultaneous down or disconnected site. Each of these three configurations uses the minimal number of servers to support the guarantees in its respective setup (two control centers plus one, two, or three data centers, respectively).

Thus, the configurations presented in columns 10 through 16 in Table 200 of FIG. 2 provide enhanced fault tolerance compared to the existing techniques. These architectures can provide SCADA functionality that is both network-attack-resilient and intrusion-tolerant.

Figure 4:
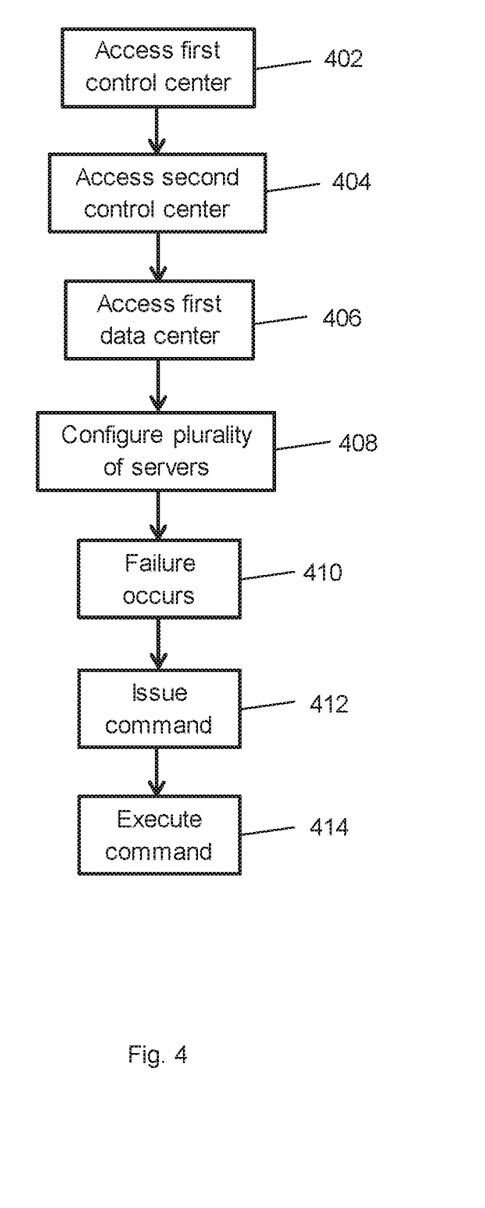
FIG. 4 is a flowchart depicting a method according to various embodiments.

FIG. 4 is a flowchart depicting a method according to various embodiments. The method may be used to establish a system according to various embodiments. For example, the method of FIG. 4 may be used to establish a SCADA system having architecture according to any of the notations: 2+2+2 (e.g., as depicted in reference to FIG. 3), 2+2+2+2, 4+4+4, 2+2+2+2+2, 3+3+2+2+2, 3+3+3+3, and 6+6+6. Other architectures are also possible.

At blocks 402, 404, and 406, the method accesses, respectively, a first control center, a second control center, and a first data center. The control centers may be geographically separate. The access may take any of a variety of forms. The access may be physical access, for example, in which server computers are installed, identified, and/or connected. Alternately, or in addition, the access may be virtual, for example, in which the servers within the respective centers are contacted through a computer network to verify their operational status. Alternately, or in addition, the access may be financial, for example, in which an owner or operator of the SCADA system provides funds to a control or data center provider in order to purchase, rent, lease, or otherwise obtain the services of the servers present therein.

At block 408, the system configures a plurality of servers. The plurality of servers may include a plurality of control center servers and a plurality of data center servers. The configuration may include configuring the servers to participate in a SCADA replication protocol together with remote units such as RTUs and/or PLCs. Alternately, or in addition, the configuration may include configuring the data center servers to not issue commands to the remote units, and configuring the control center servers to issue commands to the remote units.

At block 410, the system performing the method undergoes a failure of a particular type in the SCADA system. The failure can include failures of the type represented in the second, third, fifth and sixth rows of Table 200 of FIG. 2. That is, the failure may be any of: a proactive recovery of a single server, a disconnected or downed site (affecting all servers at the site), an intrusion of a single server, or a server intrusion during an ongoing proactive recovery of the server.

At block 412, the method includes one of the control centers issuing a command to a remote unit such as an RTU or PLC. The command may have been initiated by a client, such as client 322 of FIG. 3, for example. The command may be essentially any command, by way of non-limiting example, reading a sensor's output, getting data, writing data to a remote unit, or any Modbus function code.

At block 414, the method includes the remote unit executing the command of block 412 within, for example, 200 milliseconds of a time of issuance of the command. The 200 milliseconds time is exemplary; other times are also possible, e.g., 100 milliseconds, 300 milliseconds, 400 milliseconds, one-half of a second, 600 milliseconds, 700 milliseconds, 800 milliseconds, 900 milliseconds, or one second. The timeframe of some example embodiments is determined in part by the latency of the network infrastructure. Note that some SCADA systems cannot perform the function of this block for some error types, such as a single disconnected or downed site (corresponding to row three of Table 200 of FIG. 2). For a single disconnected or downed site, configurations 1, 2, 1-1, 2-2, 4, 6, 4-4, 6-6, and 3+3 require either a cold-backup control center to be activated (shade 206 of Table 200), or a network or site recovery or repair (shade 204 of Table 200) before any command issued to a remote unit will be executed. Such processes typically take on the order of a few minutes to a few hours, far longer than 200 milliseconds as guaranteed with the 2+2+2 configuration depicted in FIG. 3, for example.

This document concludes with the following analysis of configurations that can tolerate any given number of intrusions. The formula below defines a minimal number of servers to support f simultaneous intrusions, along with proactive recovery and a down or disconnected control center, according to some embodiments:

$$n=3f+2k+1$$

In the above formula, n represents the total number of servers, f represents the number of tolerated Byzantine faults, and k represents the tolerated combined number of servers that are simultaneously down or disconnected or undergoing proactive recovery.

Since the relevant fault model includes an entire site being down or disconnected, as well as one proactively recovering server at any given time, k is at least the number of servers in the largest site (to account for the down or disconnected site) plus one (to account for the proactively recovering server).

To find the minimum size of the largest site, according to some embodiments, note that there must be at least one available correct server in a control center in order for the system to communicate with the RTUs and remain operational. Because one control center can fail or become disconnected, and there can be up to f compromised servers and one proactively recovering server in the remaining control center, that control center must have at least f+2 servers to ensure that it will still have one correct server available. Because each control center must contain f+2 servers in this particular analysis, k must be at least f+3 to account for the disconnection or failure of a control center plus a proactive recovery in another site.

While f+2 is the minimum number of servers in a control center according to some embodiments under this analysis, there may be more than f+2 servers in each site. Some embodiments therefore must have n=3f+2k+1 total servers, and must have k be at least the number of servers in the largest site, or $$\lceil \frac{n}{S} \rceil,$$

where S is the total number of sites (i.e., control centers and data centers), plus one to account for proactive recovery, giving the requirement $$k \geq \lceil \frac{n}{S} \rceil + 1.$$

Substituting the formula for the total number of servers for n in this inequality gives the requirement:

$$k \geq \lceil \frac{3f + 2k + 1}{S} \rceil + 1$$

according to some embodiments. Solving this inequality for k gives:

$$k \geq \frac{3f + 2k + 1}{S} + 1$$
$$Sk \geq 3f + 2k + 1 + S$$
$$Sk - 2k \geq 3f + 1 + S$$
$$k(S - 2) \geq 3f + 1 + S$$
$$k \geq \frac{3f + S + 1}{S - 2}$$
$$k \geq \lceil \frac{3f + S + 1}{S - 2} \rceil$$

Combining these two requirements (according to some embodiments) gives the following formula for choosing a sufficiently large k:

$$k = \max\left(f + 3, \lceil \frac{3f + S + 1}{S - 2} \rceil\right)$$

The value of k obtained from this formula can then be used in the previous formula to find the total number of required servers (n) according to some embodiments. To distribute the required servers among the sites, f+2 servers must first be placed in each control center according to some embodiments. The remaining servers must be distributed among the sites such that no single site has more than k−1 servers, according to some embodiments. This can be achieved by making the sizes of the sites as similar to one another as possible.

|       | 1 data center | 2 data centers | 3 data centers |
|-------|---------------|----------------|----------------|
| f = 1 | 6 + 6 + 6     | 3 + 3 + 3 + 3  | 3 + 3 + 2 + 2 + 2 |
| f = 2 | 9 + 9 + 9     | 5 + 5 + 5 + 4  | 4 + 4 + 3 + 3 + 3 |
| f = 3 | 12 + 12 + 12  | 6 + 6 + 6 + 6  | 5 + 5 + 4 + 4 + 4 |

Configurations Tolerating 1, 2, and 3 Faults

The Table above presents the minimal number of servers required, according to some embodiments, to support a varied number of intrusions while simultaneously supporting a single proactive recovery and a single downed site with two control centers and 1, 2, or 3 data centers, for a total of 3, 4, or 5 sites. In the above table, the first two numbers in a cell represent the number of servers in each of the two control centers, while the remaining numbers represent the numbers of servers in the data centers, per the notation introduced herein.

As discussed above, according to some embodiments of the disclosed architecture, at least one data center is necessary to support continuous availability of the SCADA system under the fault model considered. Due to cost and management constraints, it may not be practical to add more than three data centers for some applications of SCADA systems.

Certain embodiments can be performed as a computer program or set of programs. The computer programs can exist in a variety of forms both active and inactive. For example, the computer programs can exist as software program(s) comprised of program instructions in source code, object code, executable code or other formats; firmware program(s), or hardware description language (HDL) files. Any of the above can be embodied on a transitory or non-transitory computer readable medium, which include storage devices and signals, in compressed or uncompressed form. Exemplary computer readable storage devices include conventional computer system RAM (random access memory), ROM (read-only memory), EPROM (erasable, programmable ROM), EEPROM (electrically erasable, programmable ROM), and magnetic or optical disks or tapes.

While the invention has been described with reference to the exemplary embodiments thereof, those skilled in the art will be able to make various modifications to the described embodiments without departing from the true spirit and scope. The terms and descriptions used herein are set forth by way of illustration only and are not meant as limitations. In particular, although the method has been described by examples, the steps of the method can be performed in a different order than illustrated or simultaneously. Those skilled in the art will recognize that these and other variations are possible within the spirit and scope as defined in the following claims and their equivalents.

What is claimed is:

1. A network-attack-resilient, intrusion-tolerant electronic supervisory control and data acquisition (SCADA) system comprising:
at least three centers comprising at least two control centers, the at least three centers situated at different geographic locations,
wherein the at least three centers comprise at least three SCADA centers, and
wherein the at least two control centers comprise at least two SCADA control centers;
a plurality of servers situated at the at least three centers,
wherein the at least three centers each comprise at least two servers of the plurality of servers;
wherein the plurality of servers are communicatively coupled over a computer network to each-other and to at least one remote unit;
wherein the plurality of servers are configured to participate in a replication protocol;
wherein, when servers of the plurality of servers at one center of a plurality of centers are disconnected from the computer network by a network attack that causes isolation of the one center, and when one server of the plurality of servers at another center of the plurality of centers is compromised by the attack that comprises an intrusion of the one server, the system performs the replication protocol to reach consensus among connected operational servers of the plurality of servers for system updates and to issue instructions to the remote unit.

2. The system of claim 1, wherein the replication protocol comprises a Byzantine replication protocol.

3. The system of claim 1, wherein:
one of the centers of the plurality of centers is disconnected from the computer network and the one server of the plurality of servers at the another center of the plurality of centers is compromised;
wherein the system uses the replication protocol to reach the consensus among the operational servers of the plurality of servers to issue a command to the remote unit; and
wherein the remote unit executes the command within one second of a time of issuance of the command.

4. The system of claim 1,
wherein the at least two control centers comprise the servers of the plurality of servers configured to issue the instructions to the at least one remote unit, and
wherein the plurality of centers further comprise at least a first data center comprising the servers of the plurality of servers not configured to issue the instructions to the at least one remote unit.

5. The system of claim 4, further comprising a second data center in a second different geographic location than locations of the at least two control centers and the first data center, the second data center comprising at least two servers of the plurality of servers communicatively coupled to the at least one remote unit and not configured to issue the instructions to the at least one remote unit.

6. The system of claim 5, further comprising
a third data center in a third different geographic location than locations of the at least two control centers, the first data center, and the second data center;
wherein the third data center comprises the at least two servers of the plurality of servers communicatively coupled to the at least one remote unit and not configured to issue the instructions to the at least one remote unit;
wherein each of the at least two control centers each comprise at least three servers of the plurality of servers.

7. The system of claim 4, wherein:
each of the at least two control centers each comprise at least four servers of the plurality of servers communicatively coupled to the at least one remote unit and configured to issue the instructions to the at least one remote unit; and
wherein the first data center comprises the at least four servers of the plurality of servers.

8. The system of claim 5, 6, or 7, wherein, during a time of a fault of a first at most one of the plurality of servers and an ongoing proactive recovery of a second at most one of the plurality of servers, the system uses the replication protocol to reach the consensus among connected the operational servers of the plurality of servers for system updates and to issue the instructions to the at least one remote unit, whereby the at least one remote unit executes any instruction sent by the server of the plurality of servers within one second of a time of issuance of the command.

9. The system of claim 1, wherein the at least one remote unit comprises the at least one remote unit selected from the group consisting of: remote terminal unit (RTU) and programmable logic controller (PLC).

10. The system of claim 1, wherein the plurality of servers are configured to undergo proactive recovery on a periodic basis.

11. A method of providing a network-attack-resilient, intrusion-tolerant electronic supervisory control and data acquisition (SCADA) system, the method comprising:
accessing at least three centers comprising at least two control centers, the at least three centers situated at different geographic locations,
wherein the at least three centers comprise at least three SCADA centers, and
wherein the at least two control centers comprise at least two SCADA control centers;
configuring a plurality of servers situated at the at least three centers,
wherein the at least three centers each comprise at least two servers of the plurality of servers,
wherein the plurality of servers are communicatively coupled over a computer network to each-other and to at least one remote unit,
wherein the configuring comprises configuring the plurality of servers to participate in a replication protocol;
wherein, when servers of the plurality of servers of one center of a plurality of centers are disconnected from the computer network by a network attack that causes isolation of the one center, and when one server of the plurality of servers at another center of the plurality of centers is compromised by the attack that comprises an intrusion of the one server, the plurality of servers perform the replication protocol to reach consensus among connected operational servers of the plurality of servers for system updates and to issue instructions to the remote unit.

12. The method of claim 11, wherein the replication protocol comprises a Byzantine replication protocol.

13. The method of claim 11, wherein the one center of the plurality of centers is disconnected from the computer network and the one server of the plurality of servers at the another center of the plurality of centers is compromised, the method further comprising:

using the replication protocol to reach the consensus among the operational servers of the plurality of servers to issue a command to the remote unit, whereby the remote unit executes the command within one second of a time of issuance of the command.

14. The method of claim 11, wherein the at least two control centers comprise servers of the plurality of servers configured to issue the instructions to the at least one remote unit, and wherein the plurality of centers further comprise at least a first data center comprising the at least two servers of the plurality of servers not configured to issue the instructions to the at least one remote unit.

15. The method of claim 14, further comprising:

accessing a second data center in a second different geographic location than locations of the at least two control centers and the first data center; and configuring at least two servers of the plurality of servers at the second data center and communicatively coupled to the at least one remote unit to not issue the instructions to the at least one remote unit.

16. The method of claim 15, further comprising:

accessing a third data center in a third different geographic location than locations of the at least two control centers, the first data center, and the second data center;

configuring at least two servers of the plurality of servers at the third data center communicatively coupled to the at least one remote unit to not issue the instructions to the at least one remote unit;

wherein the first control center comprises a first set of at least three servers of the plurality of servers; and wherein the second control center comprises a second set of at least three servers of the plurality of servers.

17. The method of claim 14, wherein:

each of the at least two control centers comprise at least four servers of the plurality of servers communicatively coupled to the at least one remote unit, and the first data center comprises at least four servers of the plurality of servers;

the method further comprising:

configuring the at least four servers of the plurality of servers at each of the at least two control centers to issue the instructions to the at least one remote unit; and configuring the at least four servers of the plurality of servers at the first data center to not issue the instructions to the at least one remote unit.

18. The method of claim 13, 14, or 15, further comprising, during a time of a fault of at most one of the plurality of servers and an ongoing proactive recovery of the at most one of the plurality of servers, using the replication protocol to reach the consensus among connected the operational servers of the plurality of servers for system updates and to issue the instructions to the remote unit, whereby the remote unit executes any instruction sent by the server of the plurality of servers.

19. The method of claim 11, wherein the at least one remote unit comprises the at least one remote unit selected from the group consisting of: remote terminal unit (RTU) and programmable logic controller (PLC).

20. The method of claim 11, wherein the plurality of servers are further configured to undergo proactive recovery on a periodic basis.

21. The method of claim 15, wherein:

at least two of the at least two control centers each comprise at least three servers of the plurality of servers;

the first data center comprises a first set of the at least three servers of the plurality of servers; and the second data center comprises a second set of the at least three servers of the plurality of servers.

22. The method of claim 14, wherein:

each of the at least two control centers each comprise at least six servers of the plurality of servers communicatively coupled to the at least one remote unit;

the first data center comprises a first set of the at least six servers of the plurality of servers;

the method further comprising:

configuring the at least six servers of the plurality of servers at each of the at least two control centers to issue the instructions to the at least one remote unit; and configuring the first set of the at least six servers of the plurality of servers at the first data center to not issue the instructions to the at least one remote unit.

* * * * *